United States Patent [19]

Sasada

[11] Patent Number: 5,796,820
[45] Date of Patent: Aug. 18, 1998

[54] RECOVERY OF PREVIOUS FILTER COEFFICIENTS WITH SMALLER CAPACITY MEMORY

[75] Inventor: Taisuke Sasada, Tokyo, Japan

[73] Assignee: NEC Corporation, Tokyo, Japan

[21] Appl. No.: 631,241

[22] Filed: Apr. 12, 1996

[30] Foreign Application Priority Data

Apr. 14, 1995 [JP] Japan .................. 7-089798

[51] Int. Cl.⁶ ........................................ H04M 1/00
[52] U.S. Cl. ................. 379/410; 379/411; 379/406;
379/392; 370/286; 370/290; 370/291; 370/289;
375/229; 375/232; 375/233; 375/230; 375/231
[58] Field of Search ................. 379/410, 411,
379/406, 392; 370/286, 290, 291, 289;
375/229, 232, 233, 230, 231

[56] References Cited

U.S. PATENT DOCUMENTS 4,621,173  11/1986  Guidoux ..................... 370/32.1
5,467,394  11/1995  Walker et al. ................ 379/392
5,631,900   5/1997  McCaslin et al. ............. 370/287

FOREIGN PATENT DOCUMENTS 2-98223   4/1990  Japan.

Primary Examiner—Krista Zele
Assistant Examiner—Shih-Weu Hsieh
Attorney, Agent, or Firm—Scully, Scott Murphy and Presser

[57] ABSTRACT

The echo canceler includes an N-tap FIR filter and a coefficient controller. Previous filter coefficients which were generated before an estimation error occurrence when the transmitting output signal becomes greater in power than the transmitting input signal are obtained by using only a number S of coefficient correction values and another number (N−1+S) of sequentially received signals. Since the latest (N−1) received signals are stored in (N−1) delay circuits of an N-tap FIR filter, respectively, a relatively small capacity memory may be provided to store the earlier S received signals. The number S is determined so that a time interval determined by the number S of sampling instants is longer than a response time of a double talk detector.

21 Claims, 2 Drawing Sheets

RECOVERY OF PREVIOUS FILTER COEFFICIENTS WITH SMALLER CAPACITY MEMORY

BACKGROUND OF THE INVENTION

1. Field of the Invention

The present invention generally relates to an echo canceler using an adaptive FIR (Finite Impulse Response) filter to generate an artificial echo signal, and in particular to a control method and circuit of the filter coefficients of the FIR filter in the echo canceler.

2. Description of the Related Art

In a telephone network, as known well, an echo can occur when a transmitting signal bounces off a hybrid circuit for converting between two-wire and four-wire circuits at a destination station and is reflected back to its source station. To eliminate the effect of an echo, an echo canceler can be used. A typical echo canceler is an adaptive control echo canceler employing the FIR filter whose coefficients are controlled by a coefficient controller so that the FIR filter properly generates an artificial echo signal or a copy of the echo. A displaced artificial echo signal is superimposed on the echo signal so as to cancel the echo signal and remove it from the transmission line.

Such an artificial echo signal can be properly estimated when the transmitting signal includes an echo component only. Therefore, it is necessary to inhibit the estimation of the artificial echo signal when the transmitting signal includes signal components other than the echo signal. In order to achieve this, the echo canceler is further provided with a double talk detector for detecting a double talk state where a transmitting signal includes signal components other than the echo signal. Since the double talk detector generally detects the double talk state by comparing the power of one signal with that of the other signal, it requires a certain response time to detect the double talk state, that is, there is a delay in detection of the double talk. Therefore, the estimated artificial echo signal may be deviated substantially from a proper value at the time when the double talk detector has detected the double talk state.

An improvement of the echo canceler having the double talk detector is disclosed in Japanese Patent Laid-open No. 2-98223. This echo canceler uses an integrator to produce the mean voltage of a transmitting output signal. Since the mean voltage is not changed dramatically, the artificial echo signal estimated based on the mean voltage is also kept from increasing or decreasing in voltage by a large amount.

Another improvement of the echo canceler having the double talk detector is provided with a coefficient memory storing the FIR filter coefficients generated for a constant time interval preceding the present sampling instant. When detecting the double talk state, the coefficient controller reads a set of FIR filter coefficients which was generated a predetermined time interval earlier from the coefficient memory and sets the FIR filter at the previous coefficients. Therefore, the FIR filter coefficients unaffected by the double talk are used to generate the artificial echo signal.

In the echo canceler having the integrator, however, variations of the artificial echo signal cannot entirely be eliminated because the artificial echo signal is generated based on the mean voltage of the transmitting output signal.

Contrarily, the echo canceler having the coefficient memory can eliminate variations of the artificial echo signal entirely. However, such an echo canceler requires a large capacity memory for storing all the sets of coefficients generated for a constant time interval, especially in the case where the FIR filter has a large number of taps.

SUMMARY OF THE INVENTION

An object of the present invention is to provide an echo canceler which enables eliminating variations of the artificial echo signal entirely without the need of a large capacity memory.

Another object of the present invention is to provide a coefficient control method and circuit which enable reproducing the FIR filter coefficients which were generated before the transmitting signal included components other than the echo signal.

Still another object of the present invention is to provide a coefficient control method and circuit which enable providing the FIR filter with a proper set of coefficients so as to generate a copy of the echo signal which is used to remove the echo signal from the transmitting signal even when an estimation error is detected.

According to the present invention, N previous filter coefficients which were generated before the estimation error detection are obtained by using only a predetermined number S of coefficient correction values and another predetermined number (N−1+S) of sequentially received signals. Since the latest (N−1) received signals are stored in (N−1) delay circuits of an N-tap FIR filter, respectively, a relatively small capacity memory may be provided to store the earlier S received signals. In other words, the previous filter coefficients can be obtained when S coefficient correction values and S received signals are stored.

In an echo canceler according to the present invention, a coefficient correction value is generated based on a transmitting output signal and the sequentially received signals received from the N-tap FIR filter at each sampling instant. The coefficient correction value is used to update the filter coefficients. The S coefficient correction values and the (N−1+S) received signals are stored and used to calculate the previous coefficients. The previous coefficients are filter coefficients which were generated at a previous sampling instant earlier than a sampling instant when the first means is stopped generating the coefficient correction value by a predetermined number of sampling instants. The previous filter coefficients are generated based on the S coefficient correction values and the (N−1+S) received signals when the transmitting input signal includes signal components other than the echo signals According to the previous coefficients, the FIR filter generates an artificial echo signal when the transmitting input signal includes signal components other than the echo signal.

The previous filter coefficients are preferably obtained by repeating a unit step the predetermined number of times. More specifically, the unit step generates preceding filter coefficients based on filter coefficients in question, the S coefficient correction values, and the (N−1+S) received signals. The preceding filter coefficients are filter coefficients which were generated at a preceding sampling instant earlier than a sampling instant when the filter coefficients in question are generated by one sampling instant.

The coefficient correction value is obtained by the following equation:

$$\delta(i) = \alpha \cdot \frac{e(i)}{\sum_{j=1}^{N-1} |x(i-j)|^2}$$

where δ(i) is a coefficient correction value at a sampling instant i. x(i−j) is a received signal at a sampling instant (i−j), e(i) is the transmitting output signal at a sampling instant i and α is a constant determining a convergence speed of the artificial echo signal.

The preceding filter coefficients are obtained by the following equation:

$$h^{i-1}(j) = h^i(j) - \delta(i-1) \cdot x(i-1-j),$$

where x(i−1−j) is a received signal at a sampling instant (i−1j), h$^i$(j) and h$^{i-1}$(j) represent jth filter coefficient at sampling instants i and (i−1), respectively, and δ(i−1) is the coefficient correction value at a sampling instant (i−1).

DETAILED DESCRIPTION OF THE PREFERRED EMBODIMENT

Figure 1:
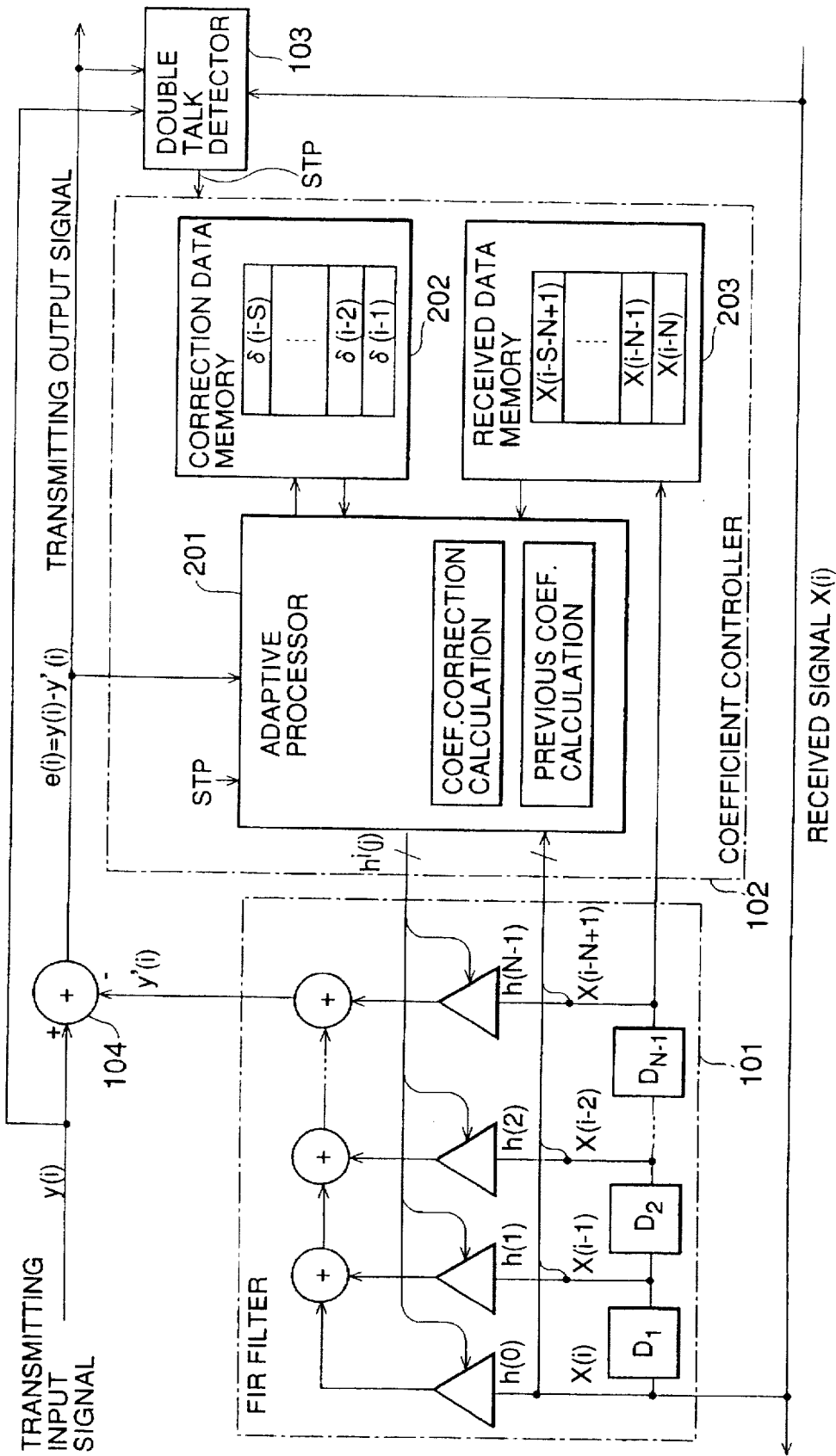
FIG. 1 is a block diagram showing an echo canceler according to an embodiment of the present invention.

Referring to FIG. 1, an echo canceler according to an embodiment of the present invention is composed of an N-tap FIR filter 101, a coefficient controller 102, a double talk detector 103, and a subtracter 104. As known well, the coefficient controller 102 provides the FIR filter with a set of coefficients h$^i$(j) (j=0, 1, 2, . . . , N−1) which are updated every sampling instant except in a double talk state, where i represents a current sampling instant. Receiving the coefficients h$^i$(j) from the coefficient controller 102, the FIR filter 101 generates an artificial echo signal y'(i) based on a series of received signals x(i), x(i−1), . . . , x(i−N+1) which are obtained through (N−1) delay flip-flop circuits D$_1$–D$_{N-1}$ or a shift resister. The artificial echo signal y'(i) is subtracted from a transmitting input signal y(i) by the subtracter 104 to produce a transmitting output signal e(i)=y(i)−y'(i), which is transmitted to a transmission line. The double talk detector 103 detects an estimation error state including a double talk state based on the transmitting input signal y(i) and the transmitting output signal e(i). The estimation error state is detected when the power of the transmitting output signal e(i) is greater than that of the transmitting input signal y(i) by a predetermined amount or more. When detecting the estimation error state, the double talk detector 103 outputs an inhibition signal STP to the coefficient controller 102. Receiving the inhibition signal STP from the double talk detector 103, the coefficient controller 102 stops updating the coefficients h$^i$(j) and then starts previous coefficient calculation as described later.

The coefficient controller 102 is composed of an adaptive processor 201, a correction data memory 202, and a received data memory 203, which are realized with a program-controlled processor such as a digital signal processor (DSP). Based on the transmitting output signal e(i) and a series of received signals x(i), x(i−1), . . . , x(i−N+1) received from the FIR filter 101, the adaptive processor 201 performs coefficient correction calculation to update a set of coefficients h$^i$(j) when the estimation error is not detected. During the estimation error state, the adaptive processor 201 performs previous coefficient calculation to reproduce a previous set of coefficients based on correction data read out from the correction data memory 202, received data read out from the received data memory 203, and a series of received signals x(i), x(i−1), . . . , x(i−N+1) received from the FIR filter 101.

The correction data memory 202 stores a predetermined number (S) of correction values δ(i−1), δ(i−2), . . . , and δ(i−S), each of which is produced in the process of the coefficient correction calculation every sampling instant. The number (S) of correction values stored in the correction data memory 202 may be determined depending on the response time of the double talk detector 103. More specifically, the number S is preferably greater than the number of sampling instants from when an estimation error actually occurs on the transmission line until the estimation error is detected by the double talk detector 103.

The received data memory 203 stores the predetermined number S of received signals x(i−N), x(i−N−1), . . . , and x(i−S−N+1) overflowing the last delay circuit D$_{N-1}$ in the FIR filter 101. In this embodiment, the delay circuits D$_1$–D$_{N-1}$ of the FIR filter 101 are used to store a latest series of received signals x(i−1), x(i−2), . . . , and x(i−N+1). Needless to say, a larger capacity memory may be provided in the coefficient controller 102 and used to store a necessary number of received signals x(i−1) to x(i−S−N+1).

PREVIOUS COEFFICIENT CALCULATION

As described above, the adaptive processor 201 performs the previous coefficient calculation when the estimation error state is detected by the double talk detector 103. The previous coefficient calculation will be described in detail hereinafter.

As known well, the impulse response estimation of the FIR filter 101 is performed according to the following equations:

$$y' = \sum_{j=0}^{N-1} h^i(j) \cdot x(i-j), \qquad (1)$$

$$e(i) = y(i) - y'(i), \text{ and} \qquad (2)$$

$$h^{i+1}(j) = h^i(j) + \alpha \cdot e(i) \cdot \frac{x(i-j)}{\sum_{j=0}^{N-1} |x(i-j)|^2}, \qquad (3)$$

where x(i) is a received signal at a sampling instant i, h$^i$(j) and h$^{i+1}$and (j) represent jth impulse response coefficient at sampling instants i and (i+1), respectively, e(i) is a transmitting output signal at a sampling instant i, y(i) is a transmitting input signal at a sampling instant i, y'(i) is an artificial echo signal generated by the FIR filter 101 at a sampling instant i, N is the number of taps of the FIR filter 101, and α is a constant determining a convergence speed of the artificial echo signal.

First, consider a step for going back by one sampling interval, by which an artificial echo signal is caused to be changed from one at a sampling instant (i+1) back to a preceding one at a sampling instant i. According to the equation (3), the preceding coefficients h$^i$(j) are represented by the following equation:

$$h^i(j) = h^{i+1}(j) - \alpha \cdot e(i) \cdot \frac{x(i-j)}{\sum_{j=0}^{N-1} |x(i-j)|^2}. \qquad (4)$$

Here, a correction value δ(i) is defined as $$\delta(i) = \alpha \cdot \frac{e(i)}{\sum_{j=0}^{N-1} |x(i-j)|^2} \quad (5)$$

Using the correction value δ(i), the equation (4) is rewritten as $$h^i(j) = h^{i+1}(j) - \delta(i) \cdot x(i-j) \quad (6).$$

Changing a current sampling instant from i+1 to i, the equation (6) can be rewritten as $$h^{i-1}(j) = h^i(j) - \delta(i-1) \cdot x(i-1-j) \quad (7).$$

In other words, the preceding set of coefficients $h^{i-1}(j)$ can be calculated using the preceding correction value δ(i−1) and a past received signal x(i−1−j) while changing the parameter j from 0 to N−1.

By repeating the above-mentioned step a predetermined number of times S (here, S=10), previous coefficients $h^{i-S}(j)$ can be obtained. Since the parameter j is changed from 0 to N−1, to obtain the coefficients $h^{i-S}(j)$ previous to the current sampling instant i by S sampling intervals, it is necessary to store a predetermined number S of correction values δ(i−1) to δ(i−S) and (N−1+S) received signals x(i−1) to x(i−S−N+1), because the parameter j is included in a received signal x(i−1−j) but the correction value δ(i). To this end, the correction data memory 202 and the received data memory 203 are provided in the coefficient controller 102. As described before, the remaining received signals x(i−1), x(i−2), . . . , and x(i−N+1) are stored in the delay circuits $D_1$–$D_{N-1}$ of the FIR filter 101.

Coefficient Control Operation

Figure 2:
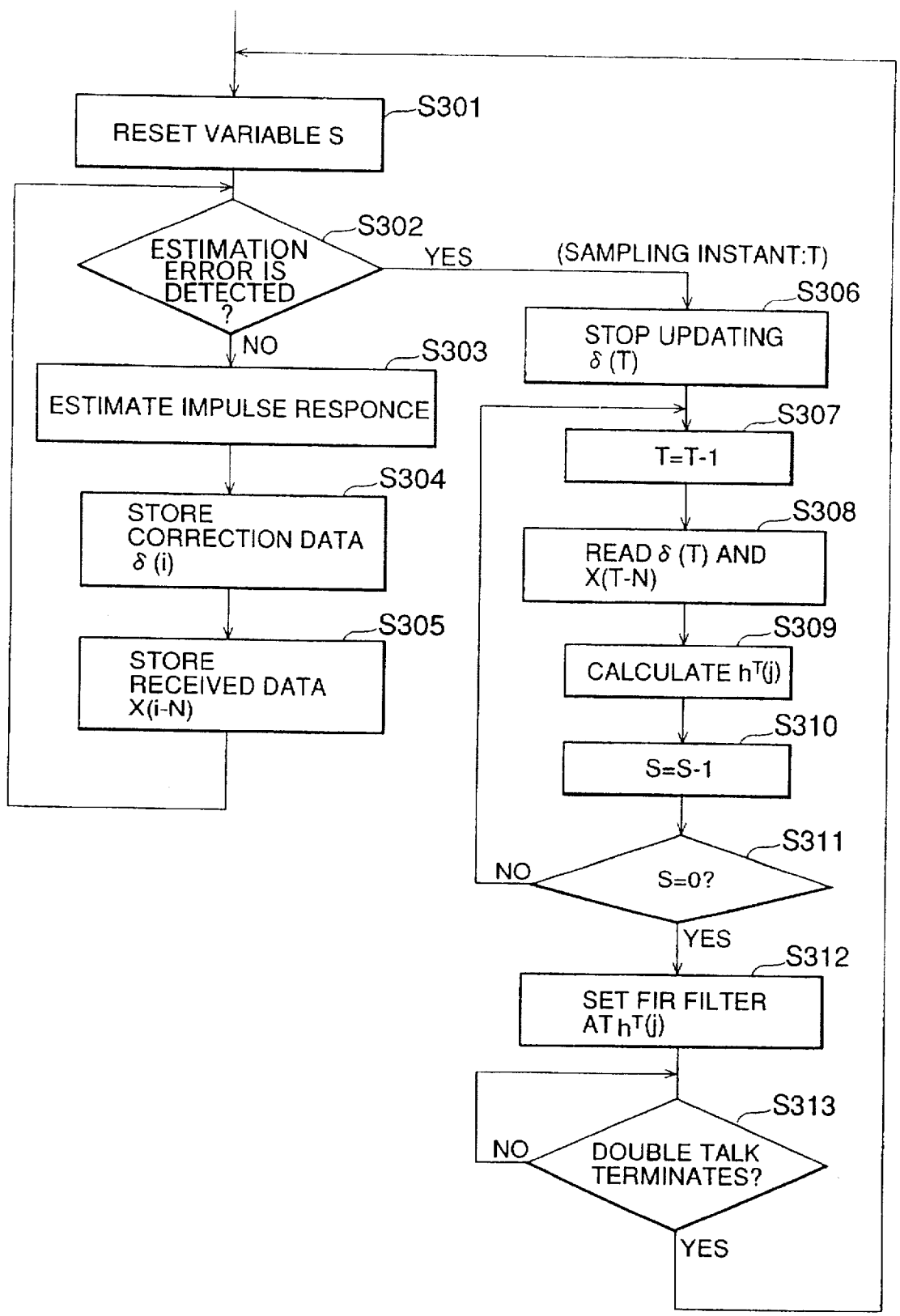
FIG. 2 is a flow chart showing a coefficient control operation according to the embodiment.

Referring to FIG. 2, the adaptive processor 201 performs either the impulse response estimation or the previous coefficient calculation depending on whether the double talk detector 103 detects an estimation error state. After resetting a variable S at an initial value which is predetermined taking into account the response time of the double talk detector 103 as described before (step S301), the adaptive processor 201 checks whether the inhibition signal STP is received from the double talk detector 103 (step S302).

When the inhibition signal STP is not received, that is, the estimation error is not detected (NO in step S302), the adaptive processor 201 estimates the impulse response and generates a set of coefficients h'(j) according to the equation (3) to output them to the FIR filter 101 (step S303). The calculated correction value δ(i) is stored into the correction data memory 202 (step S304) and the received signal x(i−N+1) overflowing the last delay circuit $D_{N-1}$ is stored into the received data memory 203 (step S305). The steps S303–S305 are repeated every sampling interval until the estimation error is detected, which causes the correction data memory 202 and the received data memory 203 to sequentially store a predetermined number of previous correction values and the same number of previous received signals, respectively.

When the inhibition signal STP is received, that is, the estimation error is detected (YES in step S302), the adaptive processor 201 stops updating a correction value δ(i), that is, stops estimating the impulse response coefficients (step S306). Hereinafter, it is assumed that the estimation error is detected at the sampling instant T.

After having stopped updating the correction value, the adaptive processor 201 decrements the value T by one (step S307) and reads a preceding correction value δ(T) from the correction data memory 202 and a preceding received signal x(T−N) from the received data memory 203 (step 308). Using the preceding correction value δ(T), the preceding received signal x(T−N), and the latest received signals x(T) to x(T−N+1) received from the FIR filter 101, the adaptive processor 201 calculates a preceding set of coefficients $h^T(j)$ according to the equation (7) (step S309). Subsequently, the variable S is decremented by one (step S310) and it is checked whether the resulting variable S is equal to zero or not (step S311). If the variable S is greater than zero (NO in step (S311), the above steps S307–S311 are repeated until the variable S become zero. By repeating the steps S307–S311 S times, a previous set of coefficients $h^T(j)$ which were estimated at a desired past sampling instant is obtained.

In this manner, the resulting coefficients $h^T(j)$ are used to set the FIR filter 101 (step S312) and the FIR filter 101 is kept at this coefficient state until the estimation error ends (step S313). When the estimation error state is terminated (YES in step S313), the variable S is reset (step S301) and then the above steps are performed.

As described above, the resulting coefficients $h^T(j)$ are impulse response coefficients which were estimated at a sampling instant previous to the time point at which the estimation error actually occurred on the transmission line. Therefore, the artificial echo signal y'(i) generated by the FIR filter 101 using the resulting coefficients $h^T(j)$ is unaffected by delay in detection of the estimation error state. In other words, this artificial echo signal y'(i) causes an echo signal to be removed effectively from the transmitting input signal.

What is claimed is:

1. An echo canceler comprising:

an N-tap finite impulse response (FIR) filter for generating an artificial echo signal based on N received signals modified by N filter coefficients, respectively, each of the N received signals being sequentially generated by delaying an input received signal by an integral multiple of a predetermined sampling interval;

a subtracter for subtracting the artificial echo signal from a transmitting input signal to produce a transmitting output signal;

first means for generating a coefficient correction value based on the transmitting output signal and the received signals received from the N-tap FIR filter at each sampling instant, the coefficient correction value being used to update the filter coefficients;

first storage means for storing M (M is an integer) coefficient correction values which are sequentially received from the first means at sampling instants;

second storage means for storing (N−1+M) received signals which are sequentially generated by delaying the input received signal by an integral multiple of the predetermined sampling interval; and second means for generating previous filter coefficients based on the M coefficient correction values and the (N−1+M) received signals when the first means is stopped generating the coefficient correction value, the previous filter coefficients being filter coefficients which were generated at a previous sampling instant earlier than a sampling instant when the first means is stopped generating the coefficient correction value by a predetermined number of sampling instants, the previous filter coefficients being used to generate the artificial echo signal.

2. The echo canceler according to claim 1, wherein the second means generates the previous filter coefficients by repeating a unit step the predetermined number of times, the unit step generating preceding filter coefficients based on filter coefficients in question, the M coefficient correction values, and the (N−1+M) received signals, and the preceding filter coefficients being filter coefficients which were generated at a preceding sampling instant earlier than a sampling instant when the filter coefficients in question are generated by one sampling instant.

3. The echo canceler according to claim 1, wherein the N-tap FIR filter comprises (N−1) delay circuits which are connected in series, the delay circuits retaining the received signals other than the input received signal, respectively.

4. The echo canceler according to claim 3, wherein the second storage means comprises:

the (N−1) delay circuits of the N-tap FIR filter, for storing (N−1) received signals; and a memory for storing M received signals which were received earlier than the (N−1) received signals.

5. The echo canceler according to claim 1, wherein the coefficient correction value is obtained by the following equation:

$$\delta(i) = \alpha \cdot \frac{e(i)}{\sum_{j=1}^{N-1} |x(i-j)|^2}$$

$(j=1, 2, 3, \ldots, N-1)$ where $\delta(i)$ is a coefficient correction value at a sampling instant i, $x(i-j)$ is a received signal at a sampling instant $(i-j)$, $e(i)$ is the transmitting output signal at a sampling instant i, and $\alpha$ is a constant determining a convergence speed of the artificial echo signal.

6. The echo canceler according to claim 2, wherein the preceding filter coefficients are obtained by the following equation:

$$h^{i-1}(j) = h^i(j) - \delta(i-1) \cdot x(i-1-j),$$

where $x(i-1-j)$ is a received signal at a sampling instant $(i-1-j)$, $h^i(j)$ and $h^{i-1}(j)$ represent jth filter coefficient at sampling instants i and $(i-1)$, respectively, and $\delta(i-1)$ is the coefficient correction value at a sampling instant $(i-1)$.

7. An echo canceler comprising:

an N-tap finite impulse response (FIR) filter for generating an artificial echo signal based on N received signals modified by N filter coefficients, respectively, and each of the N received signals being sequentially generated by delaying an input received signal by an integral multiple of a predetermined sampling interval;

a subtracter for subtracting the artificial echo signal from a transmitting input signal to produce a transmitting output signal;

a monitor for monitoring the transmitting input signal to check whether the transmitting output signal is greater in power than the transmitting input signal;

first means for generating a coefficient correction value based on the transmitting output signal and the received signals received from the N-tap FIR filter at each sampling instant, the coefficient correction value being used to update the filter coefficients, and the first means stopping generating the coefficient correction value when the transmitting output signal is greater in power than the transmitting input signal;

first storage means for storing M (M is an integer) coefficient correction values which are sequentially received from the first means at sampling instants;

second storage means for storing (N−1+M) received signals which are sequentially generated by delaying the input received signal by an integral multiple of the predetermined sampling interval;

second means for generating previous filter coefficients based on the M coefficient correction values and the (N−1+M) received signals when the first means is stopped generating the coefficient correction value, the previous filter coefficients being filter coefficients which were generated at a previous sampling instant earlier than a sampling instant when the first means is stopped generating the coefficient correction value by a predetermined number of sampling instants, the previous filter coefficients being used to generate the artificial echo signal.

8. The echo canceler according to claim 7, wherein the second means generates the previous filter coefficients by repeating a unit step the predetermined number of times, the unit step generating preceding filter coefficients based on filter coefficients in question, the M coefficient correction values, and the (N−1+M) received signals, and the preceding filter coefficients being filter coefficients which were generated at a preceding sampling instant earlier than a sampling instant when the filter coefficients in question are generated by one sampling instant.

9. The echo canceler according to claim 7, wherein a time interval determined by the predetermined number of sampling instants is longer than a response time of the monitor required to check whether the transmitting output signal is greater in power than the transmitting input signal.

10. The echo canceler according to claim 8, wherein a time interval determined by the predetermined number of sampling instants is longer than a response time of the monitor required to check whether the transmitting output signal is greater in power than the transmitting input signal.

11. The echo canceler according to claim 7, wherein the N-tap FIR filter comprises (N−1) delay circuits which are connected in series, the delay circuits retaining the received signals other than the input received signal, respectively.

12. The echo canceler according to claim 11, wherein the second storage means comprises:

the (N−1) delay circuits of the N-tap FIR filter, for storing (N−1) received signals; and a memory for storing M received signals which were received earlier than the (N−1) received signals.

13. The echo canceler according to claim 7, wherein the coefficient correction value in obtained by the following equation:

$$\delta(i) = \alpha \cdot \frac{e(i)}{\sum_{j=1}^{N-1} |x(i-j)|^2}$$

$(j=1, 2, 3, \ldots, N-1)$ where $\delta(i)$ is a coefficient correction value at a sampling instant i, $x(i-j)$ is a received signal at a sampling instant $(i-i)$, $e(i)$ is the transmitting output signal at a sampling instant i, and $\alpha$ is a constant determining a convergence speed of the artificial echo signal.

14. The echo canceler according to claim 8, wherein the preceding filter coefficients are obtained by the following equation:

$$h^{i-1}(j) = h^i(j) - \delta(i-1) \cdot x(i-1-j),$$

where $x(i-1-j)$ is a received signal at a sampling instant $(i-1-j)$, $h^i(j)$ and $h^{i-1}(j)$ represent jth filter coefficient at sampling instants i and (i−1), respectively, and δ(i−1) is the coefficient correction value at a sampling instant (i−1).

15. A method for removing an echo signal from a transmitting input signal to produce a transmitting output signal, comprising the steps of:
  a) generating an artificial echo signal based on N (N is an integer) received signals modified by filter coefficients, respectively, each of the N received signals being sequentially generated by delaying an input received signal by an integral multiple of a predetermined sampling interval;
  b) checking whether the transmitting output signal is greater in power than the transmitting input signal;
  c) generating a coefficient correction value based on the transmitting output signal and the N received signals at each sampling instant, the coefficient correction value being used to update the filter coefficients when the transmitting output signal is not greater in power than the transmitting input signal;
  d) storing M (M is an integer) coefficient correction values which are sequentially received from the first control means at sampling instants;
  e) storing (N−1+M) received signals which are sequentially generated by delaying the input received signal by an integral multiple of the predetermined sampling interval;
  f) generating previous filter coefficients based on the M coefficient correction values and the (N−1+M) received signals when the transmitting output signal is greater in power than the transmitting input signal, the previous filter coefficients being filter coefficients which were generated at a previous sampling instant earlier than a sampling instant when the transmitting output signal is greater in power than the transmitting input signal by a predetermined number of instants; and
  g) removing a first artificial echo signal from the transmitting input signal when the transmitting output signal is not greater in power than the transmitting input signal, the first artificial echo signal being updated based on the coefficient correction value at each sampling instant; and
  h) removing a second artificial echo signal from the transmitting input signal when the transmitting input signal includes a signal component other than the echo signal, the second artificial echo signal being generated based on the previous filter coefficients.

16. The method according to claim 15, wherein the previous filter coefficients are generated by repeating a unit step the predetermined number of times, the unit step comprising a step of generating preceding filter coefficients based on filter coefficients in question, the H coefficient correction values, and the (N−1+M) received signals, and the preceding filter coefficients being filter coefficients which were generated at a preceding sampling instant earlier than a sampling instant when the filter coefficients in question are generated by one sampling instant.

17. The method according to claim 15, wherein a time interval determined by the predetermined number of instants is longer than a time interval required to check whether the transmitting output signal is greater in power than the transmitting input signal.

18. The method according to claim 16, wherein a time interval determined by the predetermined number of instants is longer than a time interval required to check whether the transmitting output signal is greater in power than the transmitting input signal.

19. The method according to claim 15, wherein the step (e) comprises:
  storing (N−1) received signals; and
  storing M received signals which were received earlier than the (N−1) received signals.

20. The method according to claim 15, wherein the coefficient correction value is obtained by the following equation:

$$\delta(i) = \alpha \cdot \frac{e(i)}{\sum_{j=1}^{N-1} |x(i-j)|^2}$$

$$(j=1, 2, 3, \ldots, N-1)$$

where δ(i) is a coefficient correction value at a sampling instant i, x(i−j) is a received signal at a sampling instant (i−j), e(i) is the transmitting output signal at a sampling instant i, and α is a constant determining a convergence speed of the artificial echo signal.

21. The method according to claim 15, wherein the preceding filter coefficients are obtained by the following equation:

$$h^{i-1}(j) = h^i(j) - \delta(i-1) \cdot x(i-1-j),$$

where x(i−1−j) is a received signal at a sampling instant (i−1−j), $h^{i-1}(j)$ and $h^i(j)$ represent jth filter coefficient at sampling instants i and (i−1), respectively, and δ(i−1) is the coefficient correction value at a sampling instant (i−1).

* * * * *

UNITED STATES PATENT AND TRADEMARK OFFICE
CERTIFICATE OF CORRECTION

PATENT NO. : 5,796,820
DATED : August 18, 1998
INVENTOR(S) : Taisuke Sasada

It is certified that error appears in the above-identified patent and that said Letters Patent are hereby corrected as shown below:

Column 3, Line 4 and 5 (Formula): "j=1" should read

--j=0

(j=1,2,3,...,N-1)--

Column 4, Line 47 (Formula): After "j=0" insert --(j=0,1,2,3...,N-1)--

Column 7, Line 25 (Formula): "j=1" should read --j=0--

Column 8, Line 54, Claim 12, (Formula): "j=1" should --read --j=0--

Column 8, Line 58, Claim 13, "(i=i)" should read --(i=j)--

Column 10, Line 3, Claim 16: "H" should read --M--

Column 10, Line 30, Claim 20: "j=1" should read --j=0--

Signed and Sealed this

Seventh Day of November, 2000

Q. TODD DICKINSON

*Attest:*

*Attesting Officer*     *Director of Patents and Trademarks*